Patented Jan. 26, 1954

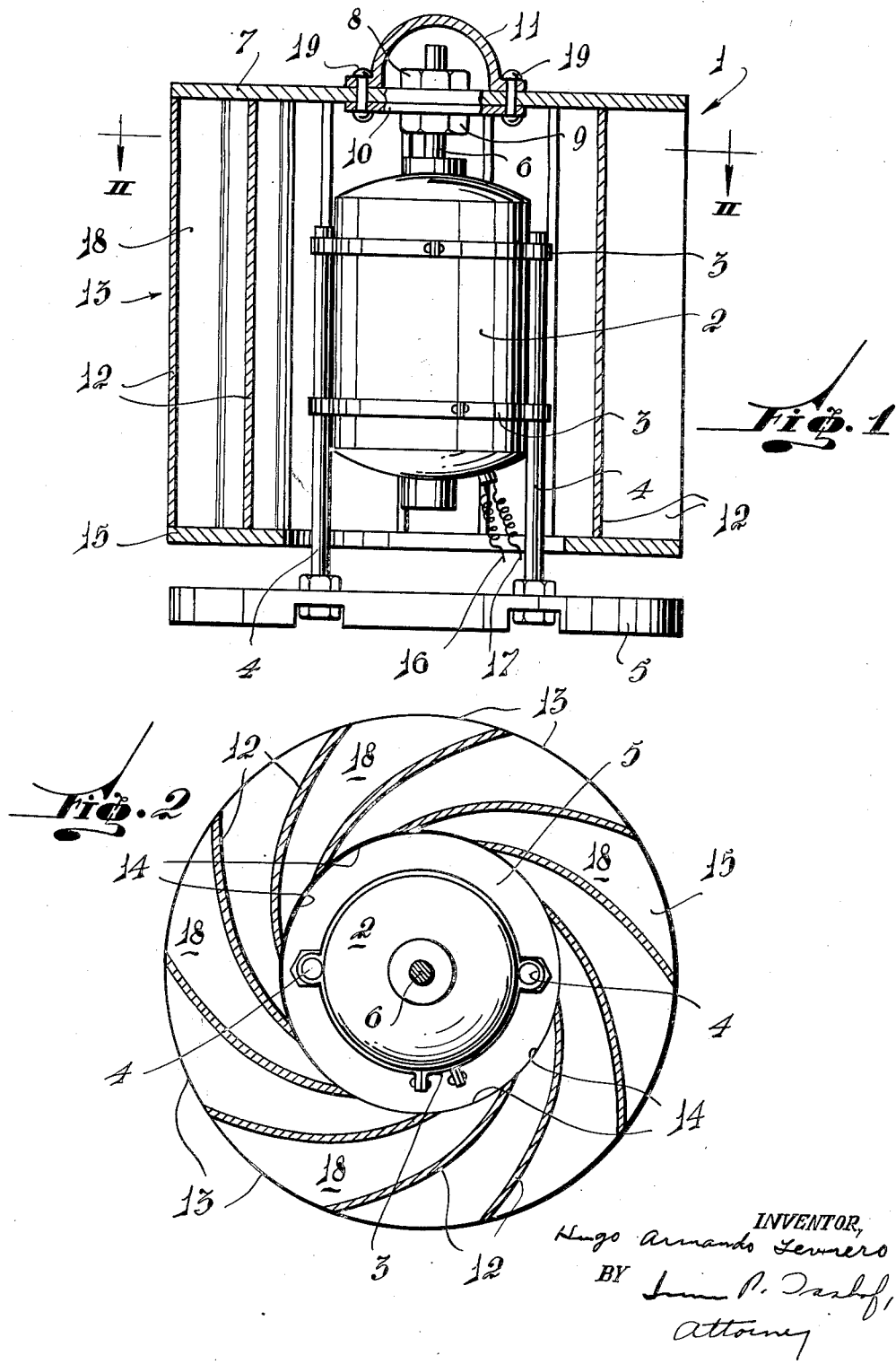

2,667,589

UNITED STATES PATENT OFFICE 2,667,589

FLUID OPERATED POWER GENERATOR

Hugo Armando Levrero, Montevideo, Uruguay

Application January 21, 1952, Serial No. 267,471

7 Claims. (Cl. 290—55)

This invention relates to a fluid operated power generator and more particularly it refers to a wind operated power generator or wind motor, which does not require any directional wind governor, such as a wing.

The known wind mills are usually rotatably mounted on the top of a tower and provided with a directional wind governor, such as a wing in order to arrange the fan in proper position with regard to the path of the wind.

In view of the requirement of said directional wind governor for the correct operation of the known devices, the latter can be used only under certain given circumstances.

The present invention does not require such a directional wind governor and therefore this wind motor can be applied in a plurality of instances wherein the known devices cannot be used, such as for instance in sailing vessels where the present wind mill can be mounted on the top of the mast.

This invention relates therefore to a fluid operated power generator which comprises a stationary power generator, the driving shaft of which supports a rotary fan surrounding said generator, said fan being formed of a plurality of spaced blades capable of capturing the fluid and transforming its latent energy into a rotary movement.

One of the objects of the present invention consists in providing a new fluid operated power generator and more particularly a wind motor which does not require a directional wind governor.

Another object is to provide an apparatus which does not require any controlling means for capturing the wind and therefore the direction from which the wind comes does not affect the operation of the apparatus.

Still another object is to provide a wind motor which may be easily mounted in small sailing boats of any type.

These objects and further advantages of the present invention will become apparent during the course of the following description in which a specific embodiment has been described and shown by way of example.

In the drawings:

Figure 1 is a side elevation partially in section of a fluid operated power generator and more particularly a wind motor, in accordance with the present invention.

Figure 2 is a cross section along line II—II of Figure 1.

The wind operated power generator or more particularly the wind motor 1 consists of an electric current generator 2 which may be of any convenient type. Preferably the body of said generator 2 is supported through clamps 3 by a plurality of columns 4 conveniently supported by a base 5.

The generator comprises a stator and a rotor (not visible) of which in the embodiment shown, the rotor is provided with a driving shaft 6 emerging out of said generator 2. A circular plate 7 is solidary with said shaft 6 and fixed thereto by means of nut 8 and lock nut 9. In order to make said connection more resistant, said plate 7 is provided with a reinforcement plate 10 and a cup 11 is fixed to said plate 7 and reinforcement 10 by means of rivets 19. Said cup protects the free end of driving shaft 6.

Plate 7 supports a plurality of blades 12 spaced from each other and thereby forming thereinbetween a plurality of channels 18 each having a wind admission opening 13 the height of which coincides with the height of the blades and the length of which corresponds to the separation existing between two adjacent blades at that end thereof. Each pair of adjacent blades also provides an exit opening 14 directed towards the carcase of the generator 2 and having a smaller cross section than the cross section of the admission opening 13, as is well known in the art of fan building.

In order to provide the plurality of blades 12 with the necessary stiffness, the lower ends of said blades are also secured together by means of an annular plate 15. Thus the wind or air which penetrates into the admission openings 13 cannot deviate upwardly or downwardly in view of plates 7 and 15 respectively and thus all the wind is projected against the carcase and thereby cools the generator.

The operation of the device is very simple. In fact, the fluid such as for instance the wind coming from any direction, penetrates through a series of admission opening 13 into the corresponding channels 18 and leaves the channels through exit openings 14 from where it passes along the carcase downwardly and out below the fan. During its passage through the channels 18, the force is decomposed in such a way that the rotary fan is started to rotate and thereby the power of the wind is transmitted to shaft 6 in order to operate the generator 2.

It is obvious that the shape of the blades 12 must be so designed as to offer the minimum resistance to the passage of the wind following the known aerodynamic principles.

The electric current produced by the generator is collected and transmitted through conductors 16 and 17 towards the source of use.

Although reference has only been made to the combination of the rotor and an electric current generator, it is obvious that the latter could be substituted by any other equivalent generator and therefore the expression "generator" has to be interpreted in its broadest sense.

I claim:

1. A wind operated power generator comprising an electric current generator having a driving shaft emerging out of said generator, a rotary fan consisting of a plate and a plurality of spaced blades supported by said plate, said fan being mounted on said driving shaft and said blades surrounding said generator, each pair of adjacent blades of said plurality of blades forming a channel having an admission opening and an exit opening for the wind, said exit openings being directed toward said generator, said plurality of spaced blades being capable of capturing the wind and transforming its energy into a rotary movement.

2. A wind operated power generator comprising an electric current generator having a driving shaft emerging out of said generator, a rotary fan consisting of a circular plate, a plurality of spaced blades and an annular plate, said plurality of spaced blades being arranged between said parallely spaced circular and annular plates with which they are integral, said circular plate being mounted on said driving shaft, said plurality of parallely spaced blades and annular plate surrounding said generator, a plurality of columns, a plurality of clamps connecting said columns with said generator, and a base supporting said columns.

3. A wind operated power generator comprising an electric current generator having a driving shaft, a rotary fan consisting of a circular plate, a plurality of spaced blades and an annular plate, said plurality of spaced blades being arranged between said parallel spaced circular and annular plates, said circular plate being mounted on said driving shaft, said plurality of parallel spaced blades and annular plate surrounding said generator, a plurality of columns, a plurality of clamps connecting said columns with said generator, and a base for supporting said columns.

4. A wind operated power generator comprising an electric current generator having a driving shaft, a rotary fan consisting of a circular plate, a plurality of spaced blades and an annular plate, said plurality of spaced blades being arranged between said parallel spaced circular and annular plates, said circular plate being mounted on said driving shaft, said plurality of parallel spaced blades and annular plate surrounding said generator, and means for supporting said generator.

5. In combination, a generator, a drive shaft operating said generator, a first plate arranged transversely with respect to said shaft and secured thereto, a plurality of blades arranged in spaced relation with respect to each other and secured to said plate, said blades defining therebetween channels having inlet and exit openings for the passage therethrough of air, and a second plate secured to the lower ends of said blades, a base arranged below said generator, a plurality of columns extending upwardly from said base, and clamps for connecting said columns to said generator.

6. A wind operated power generator comprising an electric current generator having a driving shaft, a rotary fan including a circular plate, a plurality of spaced blades and an annular plate, said plurality of spaced blades being arranged between said spaced circular and annular plates, and secured thereto, said circular plate being mounted on said driving shaft, said plurality of spaced blades and annular plate surrounding said generator, a plurality of columns, a plurality of clamps connecting said columns with said generator, a base for supporting said columns, said plates being positioned in spaced parallel relation with respect to said base, the longitudinal axis of said columns extending transversely with respect to said plates.

7. A wind operated power generator comprising an electric current generator having a driving shaft, a rotary fan including a circular plate, a plurality of spaced blades and an annular plate, said plurality of spaced blades being arranged between said spaced circular and annular plates, and secured thereto, said circular plate being mounted on said driving shaft, said plurality of spaced blades and annular plate surrounding said generator, a plurality of columns, a plurality of clamps connecting said columns with said generator, a base for supporting said columns, said plates being positioned in spaced parallel relation with respect to said base, the longitudinal axis of said columns extending transversely with respect to said plates, there being a central opening in said annular plate for the projection therethrough of said collars, a reinforcing plate secured to the inner surface of said circular plate, and a cup secured to the outer surface of said circular plate for protecting said driving shaft.

HUGO ARMANDO LEVRERO.

References Cited in the file of this patent

UNITED STATES PATENTS

| Number | Name | Date |
|---|---|---|
| 958,681 | Schulz | May 17, 1910 |
| 1,152,666 | Sterner | Sept. 7, 1915 |
| 1,423,514 | Butusov | July 25, 1922 |
| 1,571,303 | Schafran | Feb. 2, 1926 |